UNITED STATES PATENT OFFICE.

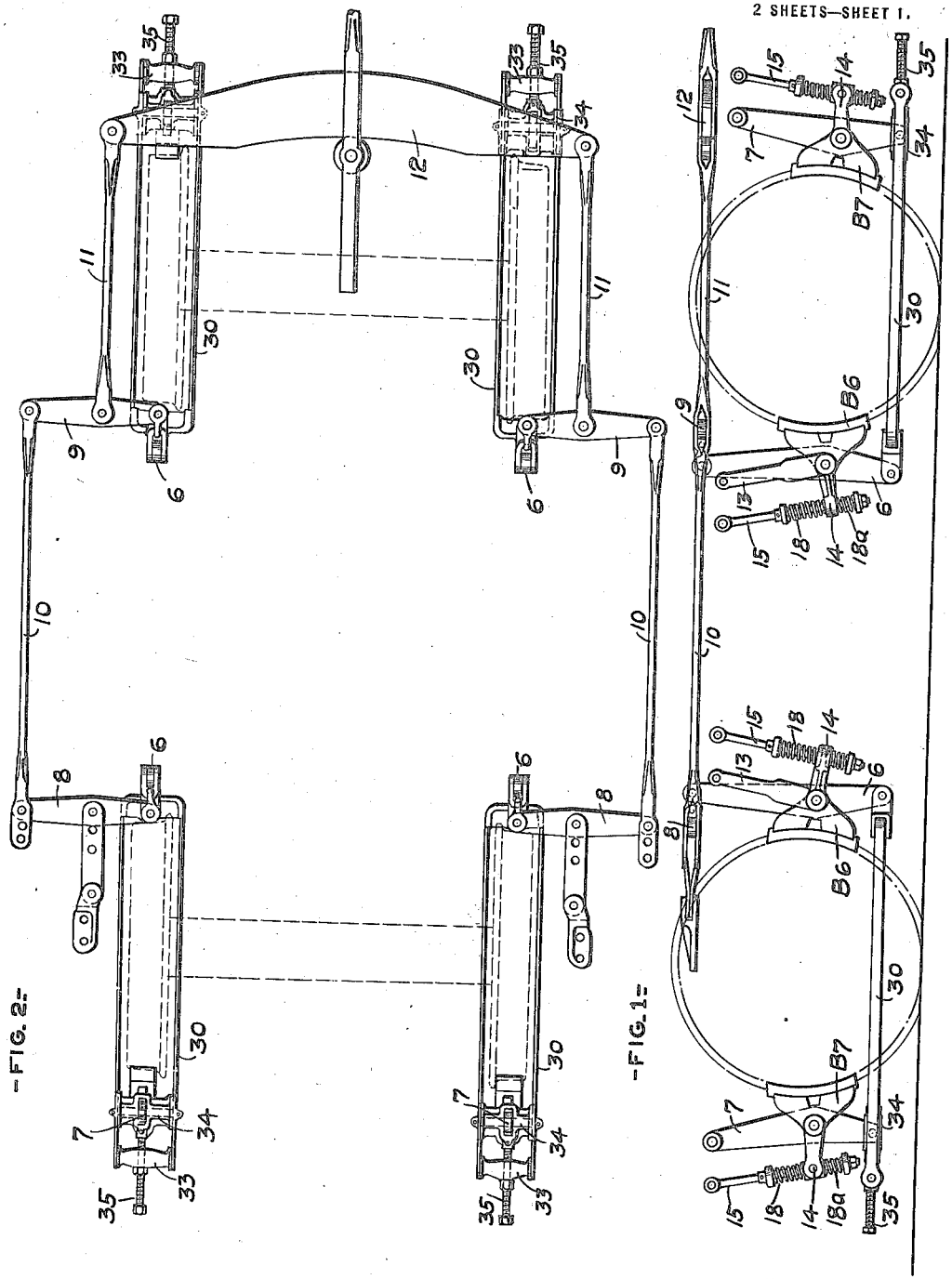
T. L. BURTON.
BRAKE RIGGING.
APPLICATION FILED JULY 26, 1917.
1,263,525. Patented Apr. 23, 1918.
2 SHEETS—SHEET 1.
INVENTOR
Thomas L. Burton
by Edward H. Wright.
Atty.

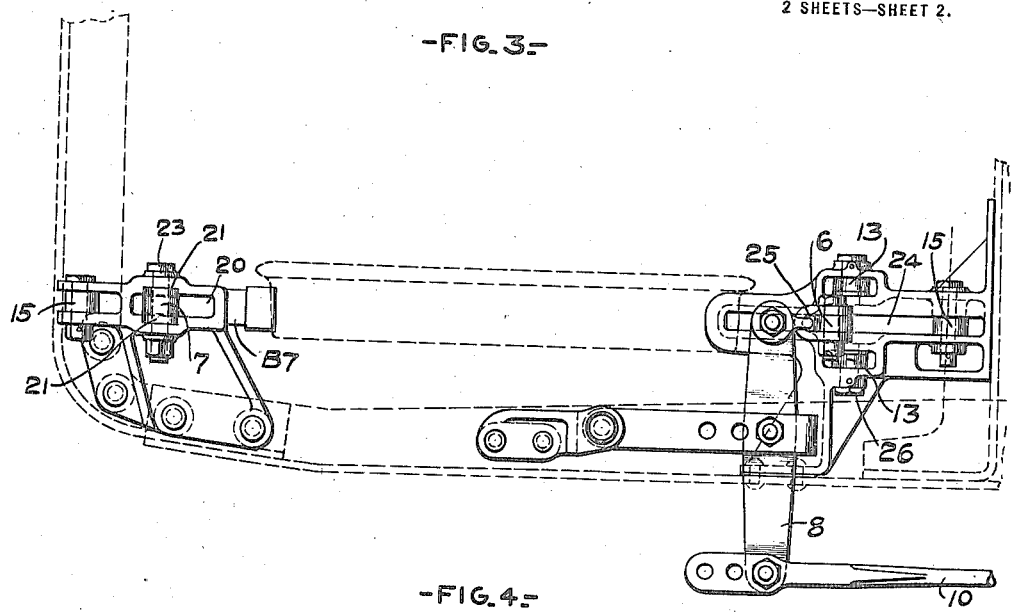
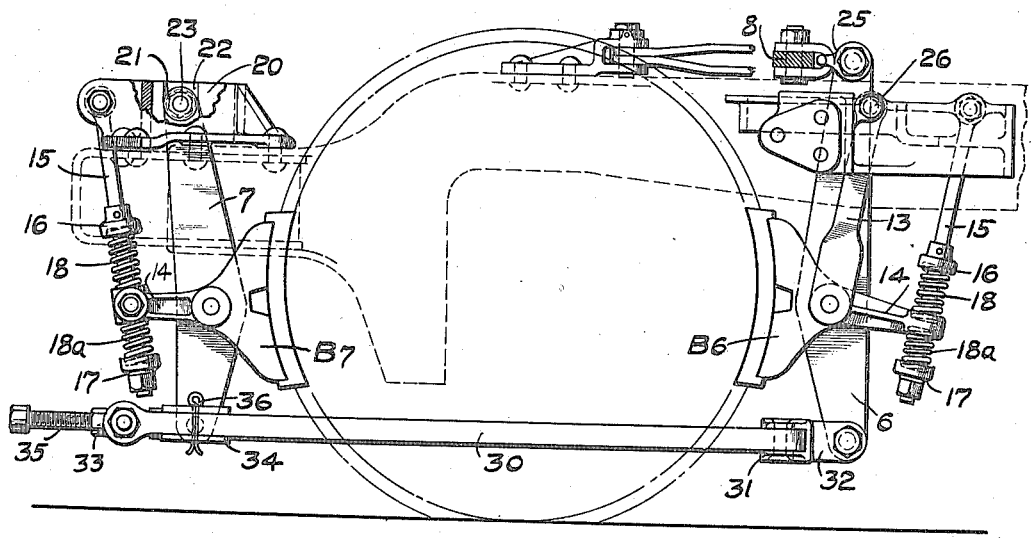
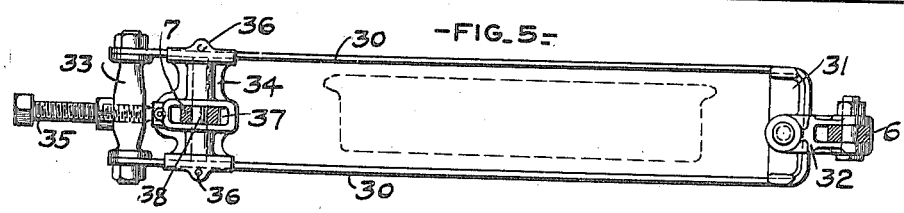

THOMAS L. BURTON, OF ST. LOUIS, MISSOURI, ASSIGNOR TO THE AMERICAN BRAKE COMPANY, OF ST. LOUIS, MISSOURI, A CORPORATION OF MISSOURI.

BRAKE-RIGGING.

1,263,525.  Specification of Letters Patent. Patented Apr. 23, 1918.

Application filed July 26, 1917. Serial No. 182,825.

*To all whom it may concern:*

Be it known that I, THOMAS L. BURTON, a citizen of the United States, residing at St. Louis, in the State of Missouri, have invented a certain new and useful Improvement in Brake-Rigging, of which improvement the following is a specification.

This invention relates to brake rigging for railway trucks, and more particularly to a beamless type of rigging in which the truck levers are located in the plane of the brake shoes and wheels. Among the objects of my invention are the provision of improved balancing means for the brake heads; a safety feature for preventing the levers from falling on the track in case of the breaking of a pin; and an improved bifurcated lower tension member and slack adjuster.

In the accompanying drawings; Figure 1 is a side elevation, and Fig. 2 a plan of a brake rigging for four-wheeled trucks, and embodying my improvement; Fig. 3 a plan, and Fig. 4 a side elevation of a portion of the same, upon a larger scale; and Fig. 5 a plan of the lower tension member and slack adjuster.

The brake design, as shown, is of the clasp, beamless type, adapted to be applied to a four-wheeled truck, and comprising live truck levers 6, pivoted to the inside brake heads $B^6$, dead truck levers 7, pivoted to the outside brake heads $B^7$, and having fulcrums at their upper ends fixed to the truck frame, and horizontal levers 8, and 9, pivotally connected at the upper ends of the live truck levers and joined at their outer ends by rod 10, one of said horizontal levers having a fixed fulcrum while the other is floating and connected by rod 11 with one end of the equalizer 12, the parts being duplicated at opposite sides of the truck. Additional hangers 13 are also provided for the brake heads $B^6$, of the live truck levers.

For the purpose of balancing the brake heads and providing for the vibration between the truck frame and wheels a spring device is employed to coöperate with the movement of the brake head upon its pivot upon the hanger or truck lever. According to a preferred construction each brake head is provided with an arm 14 extending rearwardly from the pivot and containing an opening through which passes a hanger bolt 15, pivoted at its upper end to the truck frame and carrying a fixed collar 16, at an intermediate point and an adjustable nut 17 at the lower end. Two springs 18, and $18^a$, are mounted on the hanger bolt, one above the arm 14 and one below the same, for retaining the brake head and shoe in its normal position substantially concentric with the wheel, and also provide for taking up the vibrations of the truck frame relative to the wheels when the brake shoes are applied. When it is desired to adjust the position of the brake head upon its pivot this may be done by screwing up the nut 17 at the lower end of the hanger bolt. The spring section 18, is preferably longer than the spring section $18^a$, to give the desired adjustment.

As an additional safety device for supporting the dead truck lever 7, the frame, or casting mounted thereon, is provided with a slot 20, of sufficient length to permit the lever 7, to pass through at its widest point, and the head of the lever is formed with a boss or bosses 21, fitted to slide down into the recess or groove 22, formed in the casting at the sides of the slot. The bosses resting at the bottom of the recess or socket 22, form a pivotal support for the lever aside from the pivot pin 23, passing through the same, so that even if the pivot pin should become broken or lost the lever will still be supported and not fall upon the track. The live lever 6, extends through a long slot 24, in the frame or casting and is coupled at its upper end to the horizontal lever by means of a clevis connection 25, which is of greater width than the slot 24. The lever 6 is normally supported by the hangers 13, but in case the hanger or its pivot pin 26, should become broken the lever 6 would still be supported by the clevis on the top of the casting or frame and thereby be prevented from falling on the track.

According to another feature of my improvement I provide an improved construction of lower tension member joining the lower ends of the truck levers 6 and 7, and comprising a U-shaped steel bar 30, extending upon both sides of the wheel, and having a casting 31, fitted into the base of the U and provided with the jaws 32 to which the lower end of the lever 6 is pivoted. At the other side of the wheel the two ends of the bar are rigidly bolted or otherwise fastened to the head 33, while the lever 7 is pivoted upon a cross piece or fulcrum block 34, slidably mounted in guides upon the two bars 30. The fulcrum block is adapted to be shifted along the bars by means of an adjusting screw 35, mounted in the head 33, to take up the slack in the brake rigging and to compensate for the wear of the brake shoes. The fulcrum block may be retained on the bars by means of pins 36, passing through the guide flanges outside the bars. A slot 37 is formed in the fulcrum block for the end of the lever 7, and the pivot pin 38 extends through the block from one side to the other, being retained in place by the bars 30, when the block is secured in its position on said bars. This provides a strong and durable bifurcated tension member which may be readily assembled and adjusted as desired.

Having now described my invention what I claim as new and desire to secure by Letters Patent is:

1. In a brake rigging, the combination of a truck lever, a brake head pivotally mounted thereon, a hanger bar for balancing the brake head upon its pivot, and a spring connection therefor.

2. In a brake rigging, the combination of a truck lever, a brake head pivotally mounted thereon, and having a rearwardly extending arm, a hanger bar for balancing the brake head and a spring connection between the hanger bar and said arm.

3. In a brake rigging, the combination of a truck lever, a brake head pivotally mounted thereon and having a rearwardly extending arm, a hanger bar for balancing the brake head and extending loosely through said arm, and spring sections on said bar above and below said arm.

4. In a brake rigging, the combination of a truck lever, a brake head pivotally mounted thereon and having a rearwardly extending arm, a hanger bar pivoted to the frame and extending loosely through said arm, a collar carried by said bar above the arm, a spring between the arm and said collar, an adjusting nut at the lower end of the hanger bar and another spring between the arm and said adjusting nut.

5. In a brake rigging, the combination of a frame having a slot, a truck lever extending through said slot, and means carried at the upper end of the lever of greater lateral dimensions than the width of the slot to prevent the lever from falling through the same.

6. In a brake rigging, the combination of a frame having a vertical slot formed with a lateral recess, and a truck lever extending through said slot and having a lateral projection at its upper end engaging said recess.

7. In a brake rigging, the combination of a frame having a vertical slot formed with a lateral recess, a truck lever extending through said slot and having bosses formed at its upper end, said bosses fitting into said recess, and a pivot pin passing through said bosses and the frame.

8. In a brake rigging, the combination with a live truck lever at one side of a wheel, and another truck lever at the other side of the wheel, of a tension member connecting said levers and comprising a U-shaped bar extending on both sides of the wheel, a piece with flanges fitted at the base of said U-shaped bar, and a jaw carried by said piece for attachment to one of said levers.

9. In a brake rigging, the combination with a live truck lever at one side of a wheel, and another truck lever at the other side of the wheel, of a tension member connecting said levers and comprising a U-shaped bar extending on both sides of the wheel, a rigid head connecting the two ends of said U-shaped bar, and a fulcrum block mounted on said bars and pivotally connected to one of said levers.

10. In a brake rigging, the combination with a live truck lever at one side of a wheel, and another truck lever at the other side of the wheel, of a tension member connecting said levers and comprising a U-shaped bar extending on both sides of the wheel, a rigid head connecting said bars, a fulcrum block slidably mounted on said bars and pivotally connected to one of said levers, and means for adjusting the position of said fulcrum block.

11. In a brake rigging, the combination with a live truck lever at one side of a wheel, and another truck lever at the other side of the wheel, of a tension member connecting said levers and comprising a U-shaped bar extending on both sides of the wheel, a rigid head connecting said bars, a fulcrum block slidably mounted on said bars and pivotally connected to one of said levers, and an adjusting screw mounted in said head and connected to said fulcrum block.

12. In a brake rigging, the combination with a live truck lever at one side of a wheel, and another truck lever at the other side of the wheel, of a tension member connecting said levers and comprising a U-shaped bar extending on both sides of the wheel, a fulcrum block mounted on said bars and having a slot for receiving the end of a truck lever, said block also formed with an opening adapted to be closed at its ends by said bars, and a pivot pin for the truck lever extending through said opening.

In testimony whereof I have hereunto set my hand.

THOMAS L. BURTON.